US012692984B2

(12) United States Patent
Jones et al.

(10) Patent No.: US 12,692,984 B2
(45) Date of Patent: Jul. 28, 2026

(54) REGULATOR ASSEMBLY AND TEST METHOD

(71) Applicant: ENTEGRIS, INC., Billerica, MA (US)

(72) Inventors: Edward E. Jones, Woodbury, CT (US); Sarah A. Utz, Beacon, NY (US); Joseph R. Despres, Middletown, CT (US)

(73) Assignee: Entegris, Inc., Billerica, MA (US)

( * ) Notice: Subject to any disclaimer, the term of this patent is extended or adjusted under 35 U.S.C. 154(b) by 550 days.

(21) Appl. No.: 17/244,650

(22) Filed: Apr. 29, 2021

(65) Prior Publication Data

US 2021/0341106 A1      Nov. 4, 2021

Related U.S. Application Data

(60) Provisional application No. 63/018,193, filed on Apr. 30, 2020.

(51) Int. Cl.
*F17C 13/00*      (2006.01)
*F17C 1/00*      (2006.01)
(Continued)

(52) U.S. Cl.
CPC ................ *F17C 13/00* (2013.01); *F17C 1/00* (2013.01); *F17C 13/002* (2013.01);
(Continued)

(58) Field of Classification Search
CPC ....... G05D 16/0402; F17C 1/00; F17C 13/00; F17C 13/02; F17C 13/025; F17C 13/04;
(Continued)

(56) References Cited

U.S. PATENT DOCUMENTS 4,538,447 A * 9/1985 Pravda ............... G01N 33/0004
73/23.31
5,937,895 A * 8/1999 Le Febre ................ F16K 1/305
251/118
(Continued)

FOREIGN PATENT DOCUMENTS

CN        106536377 B        1/2021
JP        2012137087 A        7/2012
(Continued)

OTHER PUBLICATIONS

Hilsenrath et al., Circular of the Bureau of Standards No. 564: Tables of Thermal Properties of Gases Comprising Tables of Thermodynamic and Transport Properties of Air, Argon, Carbon Dioxide, Carbon Monoxide Hydrogen, Nitrogen, Oxygen, and Steam, NBS CIRC 564, National Institute of Standards and Technology (NIST), pp. 1-508, 1955.

*Primary Examiner* — Helen C Kwok

(57) ABSTRACT

Regulator assemblies can be tested using test fluids selected to have a molecular weight about that of a selected fluid to be dispensed from a fluid storage and delivery vessel including the regulator assembly. The test fluid can be a single gas or a mixture. The test fluid can have a molecular weight of between 80% and 110% of the molecular weight of the selected fluid dispensed from the fluid storage and delivery vessel. Regulator assemblies tested in this manner can pass evaluation when they show fewer than two spikes on the initiation of flow of the test gas. These regulator assemblies can be installed into fluid storage and delivery vessels, particularly for storage and delivery of pressurized fluids.

15 Claims, 5 Drawing Sheets

(51) Int. Cl.

| | | |
|---|---|---|
| *F17C 13/02* | (2006.01) | |
| *F17C 13/04* | (2006.01) | |
| *G01M 13/003* | (2019.01) | |
| *G05D 16/04* | (2006.01) | |

(52) U.S. Cl.
CPC ............ *F17C 13/025* (2013.01); *F17C 13/04* (2013.01); *G01M 13/003* (2019.01); *G05D 16/0402* (2019.01); *F17C 2205/0338* (2013.01); *F17C 2205/0391* (2013.01); *F17C 2221/01* (2013.01); *F17C 2221/015* (2013.01); *F17C 2221/03* (2013.01)

(58) Field of Classification Search
CPC ...... F17C 2205/0391; F17C 2205/0323; F17C 2221/01; F17C 2221/015; F17C 2221/03; G01M 13/003
See application file for complete search history.

(56) References Cited

U.S. PATENT DOCUMENTS

| | | | | |
|---|---|---|---|---|
| 6,007,609 | A * | 12/1999 | Semerdjian | ............. F16K 1/305 222/189.1 |
| 6,019,823 | A * | 2/2000 | Tischler | ............. B01D 53/0415 96/108 |
| 6,045,115 | A * | 4/2000 | Martin, Jr. | .............. F16K 1/305 138/44 |
| 6,101,816 | A * | 8/2000 | Wang | ...................... F17C 11/00 62/48.1 |
| 6,257,000 | B1 * | 7/2001 | Wang | ........................ F17C 7/00 62/48.1 |
| 6,857,447 | B2 * | 2/2005 | Olander | .................... F17C 5/00 700/282 |
| 8,119,853 | B2 * | 2/2012 | Huang | .................. F17C 11/002 141/3 |
| 9,897,257 | B2 | 2/2018 | Despres | |
| 2003/0018088 | A1 * | 1/2003 | Raje | ..................... B01J 23/8913 518/715 |
| 2005/0056338 | A1 * | 3/2005 | Hertzler | ................. F17C 13/04 141/2 |
| 2009/0242043 | A1 * | 10/2009 | Lev | ................... H01M 8/04201 137/505.25 |
| 2011/0252962 | A1 * | 10/2011 | Von Helmolt | ........ F17C 11/005 96/112 |
| 2012/0160021 | A1 | 6/2012 | Iannuzzi et al. | |
| 2012/0285839 | A1 * | 11/2012 | Webb | ........................ F17C 3/00 29/428 |
| 2013/0125999 | A1 * | 5/2013 | Sweeney | ........... H01L 21/67017 137/624.11 |
| 2014/0216599 | A1 | 8/2014 | Loewenthal | |
| 2015/0247605 | A1 * | 9/2015 | Despres | ................. F17C 13/04 222/402.1 |
| 2017/0122496 | A1 * | 5/2017 | Scannell | ................. F17C 13/04 |
| 2018/0163875 | A1 * | 6/2018 | Heiderman | ............. F17C 13/04 |
| 2018/0180225 | A1 * | 6/2018 | Despres | ................. F17C 13/04 |
| 2019/0078696 | A1 | 3/2019 | Tom | |
| 2019/0339726 | A1 | 11/2019 | Jones | |
| 2020/0088352 | A1 * | 3/2020 | Despres | ................. F17C 11/00 |

FOREIGN PATENT DOCUMENTS

| | | | |
|---|---|---|---|
| JP | 2014084957 | A | 5/2014 |
| JP | 2018009702 | A | 1/2018 |
| KR | 100524395 | B1 | 11/2005 |
| KR | 20170141265 | A * | 12/2017 |
| TW | 201013086 | A | 4/2010 |
| WO | 2014047522 | A1 | 3/2014 |
| WO | 2019053440 | A1 | 3/2019 |

* cited by examiner

REGULATOR ASSEMBLY AND TEST METHOD

CROSS-REFERENCE TO RELATED APPLICATION

This application claims the benefit of and priority to U.S. Provisional Application No. 63/018,193, filed on Apr. 30, 2020, which is incorporated herein by reference in its entirety for all purposes.

FIELD

This disclosure is directed to methods for testing regulators for use with fluid storage and delivery vessels, and more particularly the testing of regulators to identify regulators providing acceptable spiking performance.

BACKGROUND

Pressure regulated fluid storage and delivery vessels can be used to supply fluids in industrial processes such as, for example, semiconductor manufacturing processes. Pressure regulation can be provided by a pressure regulator assembly including one or more pressure regulators.

When dispensing of the fluid is initiated, some pressure regulated fluid storage and delivery vessels can experience pressure fluctuations and instability, particularly when flow is initiated. Some industrial processes can be sensitive to such fluctuations and instability. Pressure regulators for these fluid storage and delivery vessels can be tested as a part of quality control screening for such products to identify and reject regulator assemblies that would provide spikes when initiating flow at certain pressures. Typically, light, inert gases are used as the test fluid for testing of the regulator assemblies, with the gases being selected frequently based on cost and/or handling characteristics of the fluid. The rejection rate of testing significantly affects the yield when manufacturing pressure regulators, and improper rejection of components can cause significant waste and loss in production of the pressure regulators.

SUMMARY

This disclosure is directed to methods for testing regulators for use with fluid storage and delivery vessels, and more particularly the testing of regulators to identify regulators providing acceptable spiking performance.

The testing of regulator assemblies for fluid storage and delivery vessels can be performed using molecular weights closer to the molecular weight of the fluid to be dispensed through the regulator. This can provide more accurate assessment of the flow properties through the regular assembly. The improved assessment improving the passage rate for testing while continuing to provide sufficient anti-spiking protection for flow through the regulator assembly. Since assemblies that fail are scrapped or returned, reducing the false positive rate for the rejection of regulator assemblies can save costs and reduce waste.

Testing, according to various embodiments of the disclosure, can be conducted on some or all of the regulator assemblies being assembled and installed into fluid storage and/or delivery vessels to provide quality assessments. Testing, according to various embodiments of the disclosure, can alternatively be conducted to set design parameters, for example to improve the selection of set design values, such as set points for the outlet pressures of regulator assemblies.

In an embodiment, a method of testing a regulator for a fluid supply package includes introducing a test fluid into a plurality of separate test regulator assemblies. The test fluid has a molecular weight that is between 80% and 110% of a molecular weight of a selected fluid to be supplied by the fluid supply package. Each of the plurality of test regulator assemblies includes a first regulator and a second regulator, the first regulator of each of the plurality of test regulator assemblies having a set outlet pressure. The method further includes observing a flow through the second regulators of each of the plurality of test regulator assemblies. The method further includes determining a number of spikes in the observed flow through the second regulators for each of the plurality of test regulator assemblies. The method also includes assembling a supply package regulator assembly for the fluid supply package, the supply package regulator assembly including the first regulator and the second regulator of one of the plurality of test regulator assemblies that exhibited fewer than two spikes in the observed flow.

In an embodiment, the first spikes in the observed flow are spikes in the pressure of the observed flow.

In an embodiment, the test fluid is a mixture of two or more fluids, and each of the two or more fluids are gases.

In an embodiment, the molecular weight of the test fluid is between 85% and 95% of the molecular weight of the selected fluid.

In an embodiment, the method further includes installing the supply package regulator assembly into the fluid supply package.

In an embodiment, the selected fluid includes one or more of $CF_4$, CO, $BF_3$, $SiF_4$, $AsH_3$, $PH_3$, and $GeF_4$. In an embodiment, the selected fluid is a mixture further including $H_2$.

In an embodiment, a regulator assembly for a fluid supply container for a selected fluid includes a first regulator having an outlet pressure set to a predetermined set point and a second regulator configured to receive fluid from the first regulator. The predetermined set point is an outlet pressure that produces fewer than two spikes in a flow through the second regulator when the regulator assembly is operated with a test fluid, the test fluid having a molecular weight that is between 80% and 110% of a molecular weight of the selected fluid.

In an embodiment, the test fluid is a mixture of two or more fluids, and each of the two or more fluids are gases.

In an embodiment, the molecular weight of the test fluid is between 85% and 95% of the molecular weight of the selected fluid.

In an embodiment, the selected fluid includes one or more of $CF_4$, CO, $BF_3$, $SiF_4$, $AsH_3$, $PH_3$, and $GeF_4$. In an embodiment, the selected fluid is a mixture further includes $H_2$.

In an embodiment, a fluid supply container includes a regulator assembly including a first regulator having an outlet pressure set to a predetermined set point; and a second regulator configured to receive fluid from the first regulator, wherein the predetermined set point is an outlet pressure that produces fewer than two spikes in a flow through the second regulator when the regulator assembly is operated with a test fluid, the test fluid having a molecular weight that is between 80% and 110% of a molecular weight of the selected fluid. The fluid supply container is configured to store the selected fluid.

In an embodiment, the selected fluid includes one or more of $CF_4$, CO, $BF_3$, $SiF_4$, $AsH_3$, $PH_3$, and $GeF_4$. In an embodiment, the selected fluid is a mixture further including $H_2$.

DRAWINGS

The disclosure may be more completely understood in consideration of the following description of various illustrative embodiments in connection with the accompanying drawings.

Figure 1:
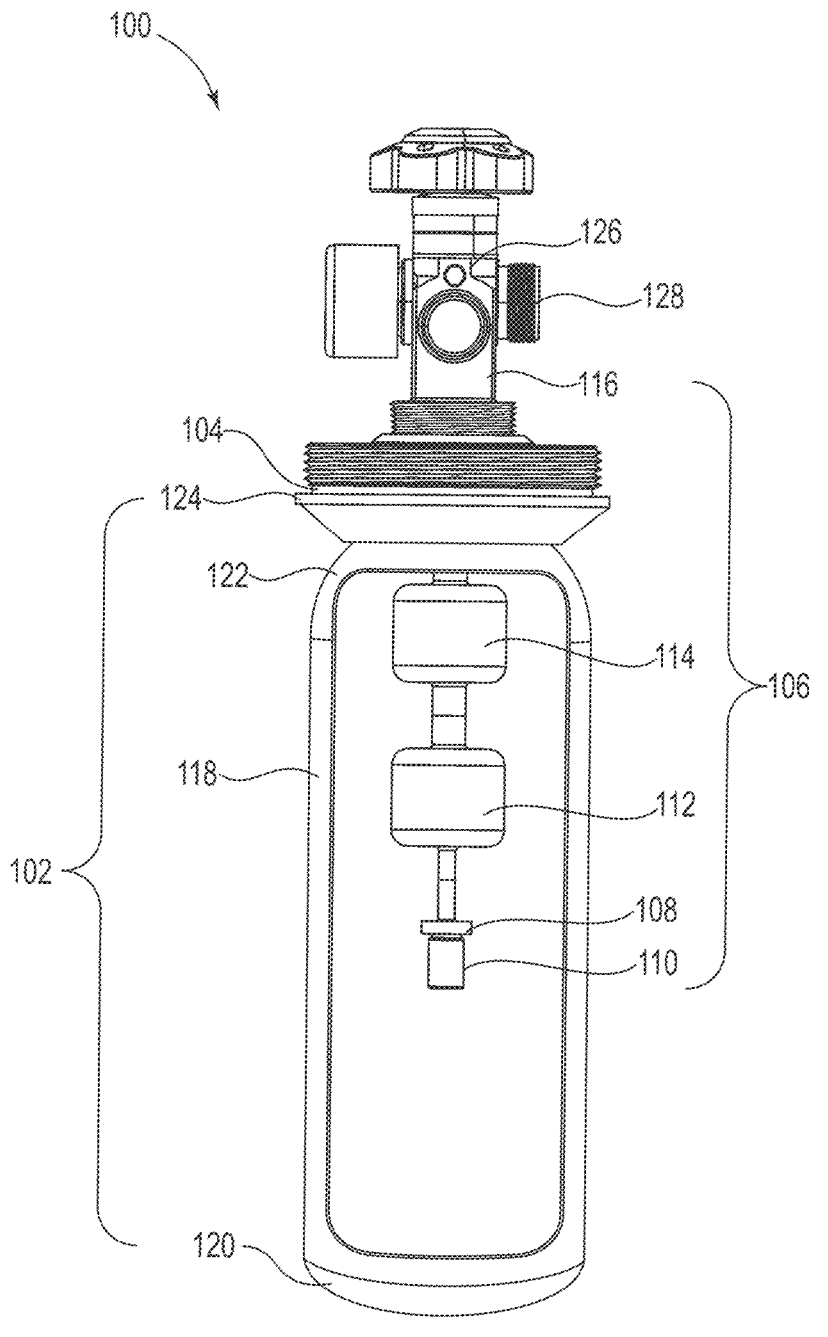
FIG. 1 shows a fluid storage and delivery vessel according to an embodiment.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

This disclosure is directed to methods for testing regulators for use with fluid storage and delivery vessels, and more particularly the testing of regulators to identify regulators providing acceptable spiking performance.

"Fluid," as used herein, refers to one or more gases, one or more liquids, or combinations thereof.

FIG. 1 shows a fluid storage and delivery vessel according to an embodiment. Fluid storage and delivery vessel 100 includes a vessel body 102 having aperture 104. Regulator assembly 106 can be included in aperture 104 to control flow into and out of the fluid storage and delivery vessel 100. Regulator assembly 106 includes an inlet 108, which can include a filter 110, first regulator 112 receiving fluid from the inlet 108, a second regulator 114 receiving fluid from the first regulator 112, and a dispenser 116 receiving fluid from the second regulator 114.

Fluid storage and delivery vessel 100 is a vessel for storing a fluid. The fluid is typically delivered in the form of a gas. The fluid can be delivered by fluid storage and delivery vessel 100 at a pressure that is below atmospheric pressure. The fluid can be stored in fluid storage and delivery vessel 100 under pressure, for example at pressures greater than atmospheric pressure. In an embodiment, the fluid storage and delivery vessel can be a Vacuum Actuated Cylinder® (VAC) package from Entegris, Inc. The fluid can be one used in industrial processes such as semiconductor manufacturing, manufacture of display components, manufacture of solar panels, or the like. The pressurized fluid can include, as non-limiting examples, $AsH_3$, $AsF_3$, $AsF_5$, $PH_3$, $NF_3$, $PF_3$, $PF_5$, $BF_3$, $BCl_3$, $B_2H_6$, $Si_2H_6$, $Si_3H_8$, $SiH_4$, $C_3H_{10}Si$, $Si(CH_3)_4$, halogenated silanes such as, for example, $SiF_4$, halogenated disilanes such as, for example, $Si_2F_6$, chlorosilanes such as $SiCl_4$, $GeH_4$, $GeF_4$, $H_2Se$, $H_2Te$, $SbH_3$, $CH_4$, $CF_4$, $CHF_3$, $CH_2F_2$, $CH_3F$, CO, $CO_2$, $COF_2$, HS, $H_2$, HF, $B_2F_4$, HCl, $Cl_2$, fluorinated hydrocarbons, $N_2$, $O_2$, $F_2$, He, Xe, Ar, Kr, organometallic gaseous reagents, mixtures of two or more of the foregoing, mixtures on one or more of the foregoing with $H_2$ or any other suitable mixing component, and/or isotopically enriched variants of the foregoing. The fluid contained within can be pressurized to any suitable pressure for the fluid being stored. In an embodiment, storage pressures within the fluid storage and delivery vessel 100 can be in a range from 200 psig to 1550 psia. In an embodiment, fluid storage and delivery vessel 100 can be configured to have a rated storage pressure service pressure of up to 2265 psia.

Vessel body 102 can define an internal space for containing the fluid. Vessel body 102 can be made of any suitable material for the vessel. Suitable materials can be capable of containing the pressurized fluid without deformation. Suitable materials can include, as non-limiting examples, one or more metals, gas-impermeable polymers, fiber-resin composites, combinations thereof, or the like. Vessel body 102 can include side wall 118 and bottom 120 forming a generally cylindrical shape, with neck 122 extending from side wall 118 towards end 124. End 124 can be opposite bottom 120 of the vessel body 102.

Aperture 104 is an opening in vessel body 102 located at end 124. Regulator assembly 106 can pass through aperture 104. Regulator assembly 106 can be sealed to vessel body 102 in any suitable leak-tight manner such that regulator assembly 106 controls flow through aperture 104, into or out of the vessel body 102. Regulator assembly 106 includes inlet 108, first regulator 112, second regulator 114, and dispenser 116.

Inlet 108 is an opening allowing the fluid within vessel body 102 to pass into regulator assembly 106. Inlet 108 can connect to an inlet of first regulator 112. Optionally, a filter 110 can be included surrounding, covering, or within inlet 108, upstream of the first regulator 112 with respect to fluid passing from the interior of vessel body 102 into and through the regulator assembly 106. Filter 110 is configured to ensure the purity of the gas and/or to prevent particulate matter from entering the regulator assembly 106. Filter 110 can be any suitable filter material for use with the fluid contained within fluid storage and delivery vessel 100. Filter 110 can be, for example, nickel, stainless steel, or polytetrafluoroethylene.

First regulator 112 is a pressure regulator located between inlet 108 and the second regulator 114 with respect to flow of the fluid through the regulator assembly 106. The first regulator 112 is a pressure regulator for a fluid. The first regulator 112 can reduce a pressure of the fluid from an inlet pressure that is at or near the pressure of the fluid within vessel body 102 to a relatively lower intermediate pressure provided at the outlet of the first regulator 112. First regulator 112 can be any suitable type of fluid pressure regulator capable of accepting fluid at an inlet pressure and providing it at a relatively lower outlet pressure. In an embodiment, first regulator 112 can be configured to accept fluids at an inlet pressure corresponding to the storage pressure of fluid storage and delivery vessel 100, for example in a range between 200 psig and 1550 psia. In an embodiment, an outlet pressure of the first regulator 112 can be determined based on testing according to the method shown in FIG. 3 and described below. In an embodiment, the outlet pressure of the first regulator can be approximately 15 to 35 psig. In an embodiment, the outlet pressure of the first regulator 112 can be approximately 20 to 30 psig. In an embodiment, the outlet pressure of the first regulator is approximately 25 psig. The outlet pressure of first regulator 112 being within these ranges can reduce observed spiking behavior observed in outlet from the second regulator 114.

Second regulator 114 is a second pressure regulator for a fluid configured to receive fluid from the first regulator 112 at approximately the outlet pressure of first regulator 112 and to provide the fluid at a relatively lower pressure at an outlet. The second regulator can be any suitable pressure regulator for receiving the fluid at the outlet pressure of the first regulator 112 and further reducing the pressure. The outlet pressure supplied by second regulator 114 can be selected based on the application where fluid storage and delivery vessel 100 is used. In an embodiment, the outlet pressure supplied by second regulator 114 can be sub-atmospheric. In an embodiment, the outlet pressure supplied by second regulator 114 can be in a range from 350 torr to 650 torr.

First regulator 112 and second regulator 114 can respectively be first and second regulators that passed through a testing process such as the one shown in FIG. 3 and described below, either prior to or following their assembly into the regulator assembly 106.

Pressure regulators that can be used as first regulator 112 and second regulator 114 can be, for example, regulators using a poppet to control flow from the inlet to the outlet of the pressure regulator. An example embodiment of such a regulator includes a main central housing communicating with inlet and outlet passages. A poppet is included in the inlet passage, and engage with the seat of the inlet passage, to close the inlet passage to fluid flow. The poppet is coupled with a stem that in turn is connected to a pressure sensing assembly in the interior volume of the pressure regulator. The pressure sensing assembly includes multiple diaphragms defining a bellows structure. The pressure sensing assembly is responsive to a pressure level in the outlet passage of the regulator, such that pressure in the outlet passage that is below a predetermined setpoint pressure will cause movement of the multiple diaphragms and corresponding translation of the pressure sensing assembly and poppet stem coupled there with, so that the poppet is disengaged from its seat to allow fluid flow through the inlet passage and central chamber of the regulator to the outlet passage, for flow of fluid from the discharge opening of the outlet passage. When fluid pressure in the outlet passage is above the set point pressure of the regulator, the pressure sensing assembly will responsively translate the poppet stem and associated poppet, so that the poppet engages the seat of the inlet passage, to close the passage to fluid flow therethrough.

Dispenser 116 can include, for example, a valve 126 and a discharge port 128. Valve 126 controls flow through the regulator assembly, obstructing or permitting flow from the second regulator 114 towards discharge port 128. Discharge port 128 is an opening where fluid can exit the regulator assembly 106 outside the fluid storage and delivery vessel 100, when valve 126 is in an open position allowing at least some flow to pass through. Fluid storage and delivery vessel 100 can further include attachment or retention features such that the discharge port 128 can be attached to provide fluid to, for example, an industrial tool, such as a tool for semiconductor processing, display manufacturing, solar panel manufacturing, or the like.

Figure 2:
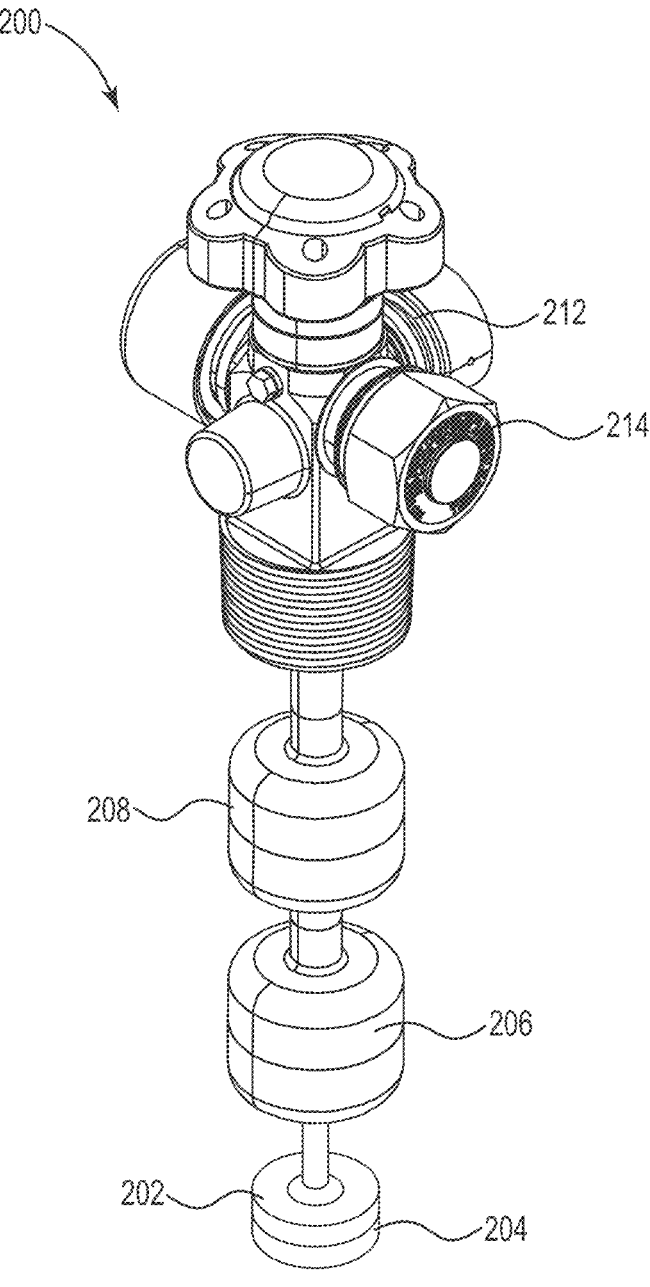
FIG. 2 shows a regulator assembly for a fluid storage and delivery vessel according to an embodiment.

FIG. 2 shows a regulator assembly 200 for a fluid storage and delivery vessel according to an embodiment. Regulator assembly 200 includes inlet 202, which is covered by a filter 204. Regulator assembly 200 further includes first regulator 206 configured to receive fluid from the inlet 202, a second regulator 208 configure to receive fluid from the outlet of the first regulator 206, and a dispenser 210 configured to receive fluid from the outlet of the second regulator 208.

Regulator assembly 200 can be assembled as a component for subsequent installation into or use with a vessel, for example by being placed into an aperture of a vessel such as aperture 104 of vessel 100 and sealed such that fluid entering or leaving the vessel must pass through the regulator assembly 200.

In embodiments, regulator assembly 200 can be positioned in a vessel such that any one or more of the inlet 202, first regulator 206, and second regulator 208 are located within the internal space, and the remaining one or more of first regulator 206, second regulator 208, and dispenser 210 are located outside of an internal space defined by the vessel. Any such configuration can be used so long as the inlet 202 is positioned within the vessel and the dispenser 210 is outside the vessel. In an embodiment, one of more of the first regulator 206 and second regulator 208 can be located within a body of the vessel, within the neck of the vessel, and/or in a body of a valve controlling flow out of the vessel.

Inlet 202 allows fluid to enter the regulator assembly 200 such that it can pass therethrough. The inlet 200 can be an aperture connected to a fluid line extending to first regulator 206. Filter 204 can be located around, over, or within inlet 202 or along a fluid line from inlet 202 to first regulator 206. Filter 204 can be any suitable filter for use with the fluid that will be flowed through regulator assembly 200.

First regulator 206 is a fluid pressure regulator configured to reduce a fluid from a relatively high pressure at or about the pressure of the fluid when received at inlet 202 and to provide the fluid at a relatively lower outlet pressure. First regulator 206. The outlet of first regulator 206 can be provided to second regulator 208, for example by a fluid line providing fluid communication from the outlet of first regulator 206 to an inlet of second regulator 208. In an embodiment, the first regulator is configured to accept fluid at a pressure selected based on the pressure of the fluid within a vessel in which regulator assembly 200 will be installed. In an embodiment, an outlet pressure of the first regulator 206 can be determined based on testing according to the method shown in FIG. 3 and described below. In an embodiment, the outlet pressure of the first regulator 206 can be approximately 15 to 35 psig. In an embodiment, the outlet pressure of the first regulator 206 can be approximately 20 to 30 psig. In an embodiment, the outlet pressure of the first regulator is approximately 25 psig. The outlet pressure of first regulator 206 being within these ranges can reduce observed spiking behavior observed in outlet from the second regulator 208.

Second regulator 208 is a pressure regulator configured to receive fluid at or near the outlet pressure of the first regulator 206 and to further reduce the pressure to a value suitable for delivery of the fluid, for example through dispenser 210. Second regulator 208 can be any suitable fluid pressure regulator capable of performing this reduction in pressure. In an embodiment, the outlet pressure supplied by second regulator 208 can be sub-atmospheric. In an embodiment, the outlet pressure supplied by second regulator 208 can be in a range from 350 torr to 650 torr.

First regulator 206 and second regulator 208 can respectively be first and second regulators that passed through a testing process such as the one shown in FIG. 3 and described below, either prior to or following their assembly into the regulator assembly 200.

Pressure regulators that can be used as first regulator 206 and second regulator 208 can each be, for example, regulators using a poppet to control flow from the inlet to the outlet of the pressure regulator. An example embodiment of such a regulator includes a main central housing communicating with inlet and outlet passages. A poppet is included in the inlet passage, and engage with the seat of the inlet passage, to close the inlet passage to fluid flow. The poppet is coupled with a stem that in turn is connected to a pressure sensing assembly in the interior volume of the pressure regulator. The pressure sensing assembly includes multiple diaphragms defining a bellows structure. The pressure sensing assembly is responsive to a pressure level in the outlet passage of the regulator, such that pressure in the outlet passage that is below a predetermined setpoint pressure will cause movement of the multiple diaphragms and corresponding translation of the pressure sensing assembly and poppet stem coupled there with, so that the poppet is disengaged from its seat to allow fluid flow through the inlet passage and central chamber of the regulator to the outlet passage, for flow of fluid from the discharge opening of the outlet passage. When fluid pressure in the outlet passage is above the set point pressure of the regulator, the pressure sensing assembly will responsively translate the poppet stem and associated poppet, so that the poppet engages the seat of the inlet passage, to close the passage to fluid flow therethrough.

Dispenser 210 allows controllable discharge of the fluid received at inlet 202 and passing through regulator assembly 200. Dispenser 210 can include valve 212 controlling flow from the outlet of second regulator 208 to a discharge port 214. Discharge port 214 is an opening allowing fluid provided at inlet 202 to exit the regulator assembly 200. The regulator assembly 200 can further include attachment or retention features such that the discharge port 214 can be attached to provide fluid to, for example, an industrial tool, such as a tool for semiconductor processing, display manufacturing, solar panel manufacturing, or the like.

Regulator assemblies according to embodiments can include additional regulators upstream of the first regulator 206, further reducing pressure before reaching the first regulator 206, which then reduces the pressure to an output pressure suitable for intake by second regulator 208, second regulator 208 in turn supplying fluid at a suitable pressure for delivery from the vessel. Testing according to embodiments, such as the embodiment described below and shown in FIG. 3 can be used to determine inlet and outlet pressures for some or all of the upstream regulators as well as the first regulator as described below.

Figure 3:
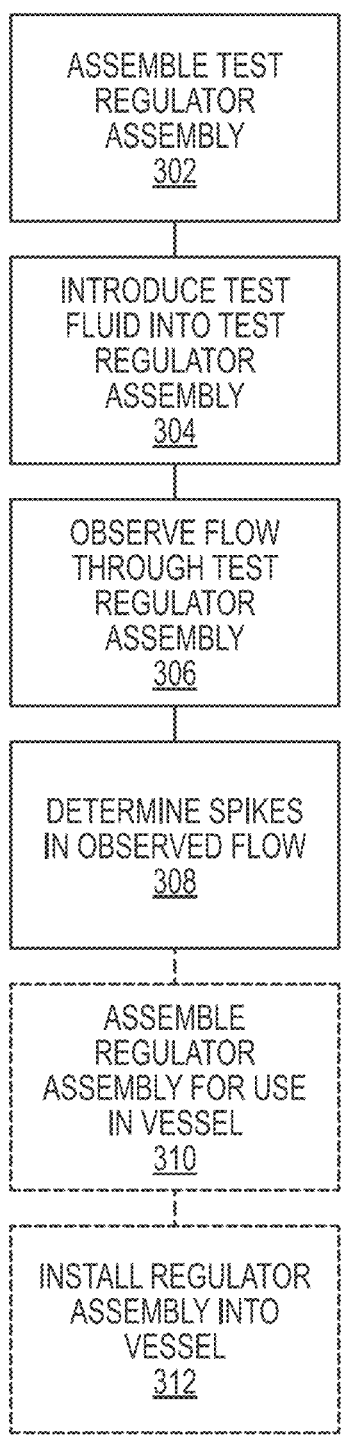
FIG. 3 shows a flowchart of a method for testing a regulator assembly for a fluid storage and delivery vessel.

FIG. 3 shows a flowchart of a method for testing a regulator assembly for a fluid storage and delivery vessel. In method 300, test regulator assemblies are assembled 302, a test fluid is introduced into each of the test regulator assemblies 304, flow is observed 306, a number of spikes in the observed flow is determined 308, and a regulator assembly for use in a vessel is obtained 310.

Method 300 can be used, for example, as quality control testing for regulators in the preparation of regulator assemblies for use in fluid storage and delivery vessel products. Method 300 can be used to test and compare different regulator and setting parameters to determine regulator settings for use in regulator assemblies.

Test regulator assemblies are assembled at 302. Assembly of the test regulators at 302 includes placing a first regulator into fluid communication with a source of test fluid and placing a second regulator into fluid communication with the outlet of the first regulator. The first regulator and second regulator of a test regulator assembly can respectively be, for example, first regulator 112 or 206, and second regulator or 208 as described above and shown in FIGS. 1 and 2. In the test regulator assembly, the first regulator is upstream of the second regulator with respect to the flow of test fluid provided at 304, corresponding to the first regulator being between an inlet and the second regulator in a regulator assembly such as regulator assemblies 106 and 200 described above and shown in FIGS. 1 and 2. In an embodiment, each of the first and second regulators are placed into a test setup to assemble the test regulator assembly at 302. In an embodiment, the first and second regulators are assembled into a complete regulator assembly such as regulator assemblies 106 or 200 described above and shown in FIGS. 1 and 2, and the test regulator assembly is then put into fluid communication with the source of the test fluid to assemble the test regulator assembly at 302.

A test fluid is introduced into each of the test regulator assemblies at 304. The test fluid can be delivered at a predetermined pressure. The predetermined pressure can correspond to, for example, a maximum pressure at which a selected fluid will be stored in a vessel including a regulator assembly. In an embodiment, the predetermined pressure can be higher than the maximum pressure at which the selected fluid will be stored, for example so that there is a safety margin in the results of testing. The predetermined pressure can be selected based on whether the test is being run for experimental purposes for selection of regulator characteristics or for quality control assessments for regulator assemblies. In an embodiment, the predetermined pressure can be in a range from approximately 100 psia to 1500 psia. In an embodiment, the predetermined pressure is approximately 155 psia during quality control assessment of regulator assemblies. The predetermined pressure is provided at initiation of the flow of the test fluid at 304. The predetermined pressure can be maintained throughout the provision of the test fluid to the test regulator assemblies.

It is appreciated that, as described below and shown in FIG. 5, the test results and spiking performance are influenced by the molecular weight of the fluid flowing through the regulator assembly. For a selected fluid that will be stored and dispensed from a vessel including the regulator assembly, the test fluid can be selected to have a molecular weight that is between 80% and 110% of the molecular weight of the selected fluid. In an embodiment, the test fluid is selected to have a molecular weight that is between 85% and 95% of the molecular weight of the selected fluid. For selected fluids that include a single compound, the molecular weight can be determined by any suitable means, for example through standard calculations of molecular weight. For selected fluids that are mixtures, the molecular weight can be determined by, for example gravimetric analysis of the weight of each addition to a known volume, calculating a weighted average of the components of the mixture, testing of a sample of the mixture to estimate a molecular weight, using predetermined values supplied by the supplier of the materials, or any other such suitable method of obtaining a molecular weight value for the mixture. In an embodiment, the test fluid can include a single compound, and the molecular weight of that test fluid can be determined by any suitable means, for example through standard calculations of molecular weight. In an embodiment, the test fluid is a mixture formed to have a selected molecular weight as determined by, for example, a weighted average of the components of the mixture, gravimetric measurement including measuring a weight of each component of the mixture as it is added to the test mixture, or any other such method, with the selected molecular weight being within the range with respect to the selected fluid.

The selected fluid can be any suitable fluid of interest to be delivered using a fluid storage and delivery vessel. Non-limiting examples of the selected fluid include $AsH_3$, $AsF_3$, $AsF_5$, $PH_3$, $NF_3$, $PF_3$, $PF_5$, $BF_3$, $BCl_3$, $B_2H_6$, $Si_2H_6$, $Si_3H_8$, $SiH_4$, $C_3H_{10}Si$, $Si(CH_3)_4$, halogenated silanes such as, for example, $SiF_4$, halogenated disilanes such as, for example, $Si_2F_6$, chlorosilanes such as $SiCl_4$, $GeH_4$, $GeF_4$, $H_2Se$, $H_2Te$, $SbH_3$, $CH_4$, $CF_4$, $CHF_3$, $CH_2F_2$, $CH_3F$, $CO$, $CO_2$, $COF_2$, $HS$, $H_2$, $HF$, $B_2F_4$, $HCl$, $Cl_2$, fluorinated hydrocarbons, $N_2$, $O_2$, $F_2$, He, Xe, Ar, Kr, organometallic gaseous reagents, mixtures of two or more of the foregoing, mixtures on one or more of the foregoing with $H_2$ or any other suitable mixing component, and/or isotopically enriched variants of the foregoing.

The test fluid can be any suitable fluid having a molecular weight as described above that is capable of being supplied at pressure and passed through the test regulator assembly. The test fluid can include a single selected compound or be a mixture of multiple compounds. In an embodiment, the test fluid is composed of inert gases. The test fluid can include one or more of, as non-limiting examples, hydrogen, helium, argon, krypton, xenon, carbon tetrafluoride, or mixtures thereof. In an example embodiment, the test fluid can be an argon-xenon mixture.

Flow is observed at 306. The observed flow can be the flow at an outlet of the second regulator of the test regulator assembly. The observation of the flow can include measurement of one or more of a pressure of the dispensed gas, a velocity of the flow, a volumetric flow rate of the flow, or any other suitable measure reflective of the quantity of the flow over time through the second regulator. The observation of the flow is performed over time and includes the initiation of the flow of the test fluid. The observation can be made using any suitable sensor for taking the measurements, positioned at or downstream of an outlet of the second regulator of the test regulator assembly.

A number of spikes in the observed flow is determined at 308. The spikes can be determined by, for example, processing data obtained when observing the flow at 306 to determine a number of peaks occurring in the measured value. Peaks can be identified by any suitable processing technique for the data. Examples of multiple such peaks can be seen, for example, in FIGS. 4B and 5 and described below. The number of spikes in the observed flow determined at 308 can then be compared to a threshold value used to pass or reject the regulators of the test regulator assembly. The threshold value can be any threshold for spiking performance through the regulator assembly that is acceptable for the application in which the regulator assembly or the fluid storage and delivery vessel will be used, and may vary with said application. In an embodiment, two or more spikes result in rejection of the regulators of the test regulator assembly. In an embodiment, fewer than two spikes results in passing the regulators of the test regulator assembly for use in a regulator assembly for a fluid storage and delivery vessel. In some embodiments, two spikes may also be deemed acceptable and passed for use. In an embodiment, multiple test regulator assemblies having different parameters such as first regulator outlet pressure can be prepared at 302 and have flow supplied and observed 304, 306, with passage or failure of those test regulators used to determine acceptable or preferred values for the parameters that are varied among the different test regulator assemblies.

A regulator assembly for use with a vessel can optionally be obtained at 310. When a test regulator assembly is passed after determining at 308 that the number of spikes is below a threshold, a regulator assembly for use with a vessel can be obtained using some or all of the components of the test regulator assembly. In an embodiment, assembling the regulator assembly at 310 can include taking the first and second regulator from the test regulator assembly assembled at 302 and providing an inlet connecting to the first regulator, a fluid line connecting an outlet of the first regulator to the second regulator, and a dispenser connected to an outlet of the second regulator, for example to obtain the arrangement shown for regulator assemblies 106 or 200 described above and shown in FIGS. 1 and 2.

Optionally, the regulator assembly that is assembled at 310 can further be assembled into a fluid storage and delivery vessel 312. The regulator assembly 310 can be installed into an aperture of a vessel, such as aperture 104 of vessel body 102 shown in FIG. 1 and described above, with the regulator assembly sealed so that all fluid must travel through the regulator assembly to enter or leave the resulting vessel. The fluid storage and delivery vessel can then be used to store and deliver pressurized fluids such as any listed above.

Figure 4A:
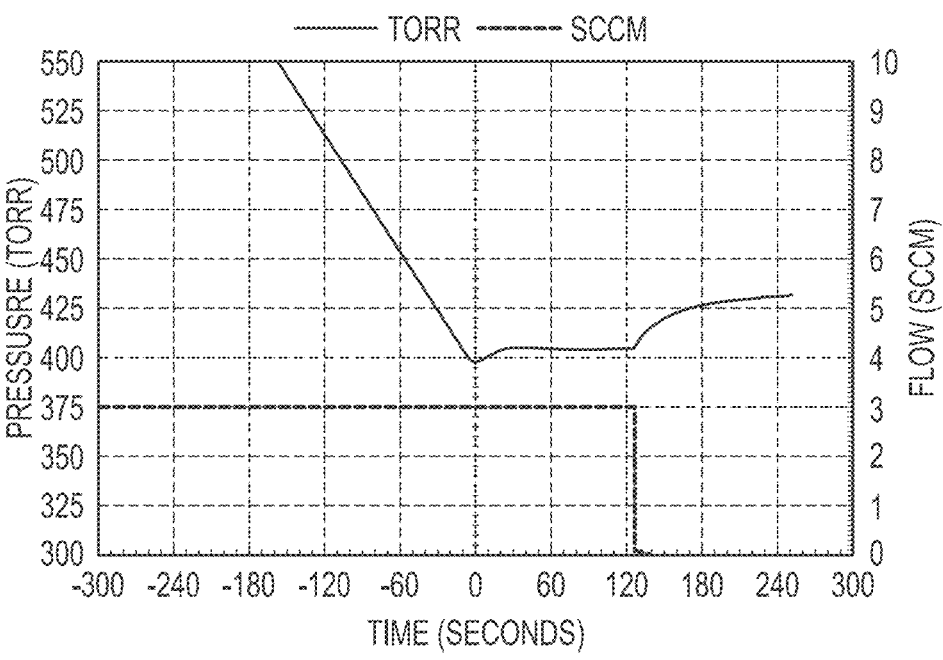
FIG. 4A shows a response of a regulator assembly to a flow without spiking when tested according to an embodiment.

FIG. 4A shows an example response of a regulator assembly to a flow without spiking when tested according to an embodiment. As can be seen in FIG. 4A, the pressure drops over time to a minimum value of 400 torr. Time T=0 is assigned to the occurrence of this minimum value. Following reaching the minimum pressure value, the pressure smoothly recovers to slightly above 400 torr, where it is remains as the test fluid continues to be flowed until T=120 seconds, as indicated by the "SCCM" line. The example response shown in FIG. 4A would provide a smooth, consistent pressure of the fluid from within a fluid storage and delivery vessel is delivered, suitable for use with even sensitive industrial tooling such as tools for semiconductor, device, or solar panel manufacturing.

Figure 4B:
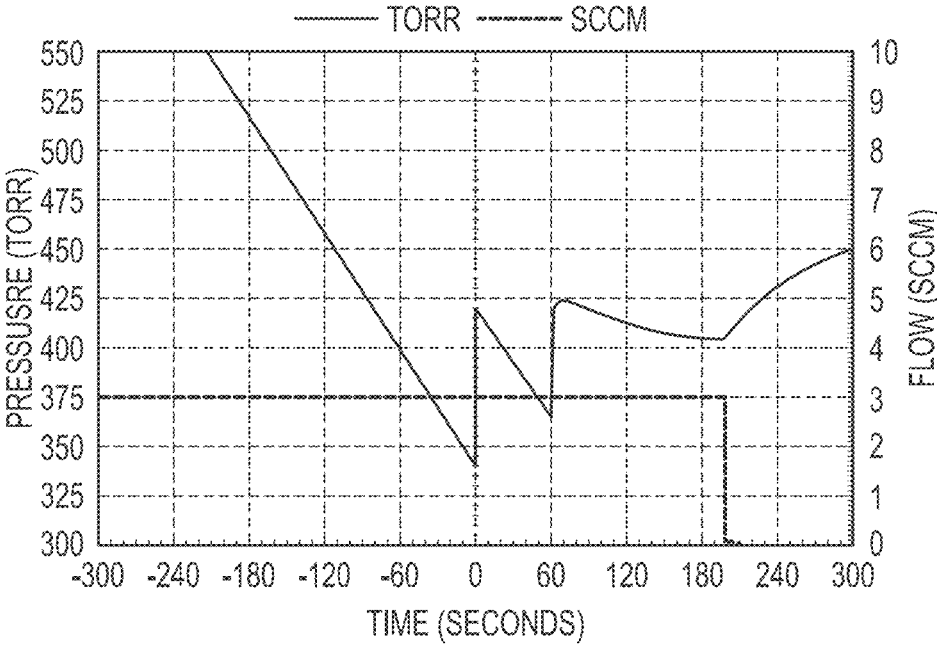
FIG. 4B shows a response of a regulator assembly to a flow including spiking when tested according to an embodiment.

FIG. 4B shows a response of a regulator assembly to a flow including spiking when tested according to an embodiment. In the results shown in FIG. 4B, the pressure drops to a minimum value of under 350 torr. For the purposes of the chart, the time T=0 is set to be at the point in time where that minimum pressure value is achieved. The pressure almost immediately spikes back to 425 torr before another sharp decrease to 375 torr before another near-immediate spike back to approximately 425 torr, after which a gradual, smooth decline towards 400 torr occurs until the end of the supply of test fluid as shown by the SCCM line on the chart. The two upward spikes in pressure along with the second sharp decline are representative of spiking behavior that can be observed in some regulator assemblies. In some regulator assemblies, the spiking may repeat further, providing continued oscillation between relatively high and relatively low pressures. Some industrial tools, for example some tools used for semiconductor, display, or solar panel manufacturing, cannot handle such inconsistencies in the pressure of a supplied fluid. Such inconsistencies can, for example, cause product to be lost, expensive downtime on the processing tool or disruption of flow through a manufacturing line, or other waste of components, time, and/or materials. Accordingly, the spiking behavior shown in with multiple sharp decreases followed by sudden increases can be unsuitable for use in fluid storage and delivery vessels for such sensitive applications. Typically, a single spike can be acceptable in many applications for fluid storage and delivery vessels, while two or more such spikes will require rejection of a regulator assembly. However, it is appreciated that tolerance to spiking can vary across applications, and the acceptance or rejection of regulator assemblies can be based on whether the spiking behavior of a regulator assembly is suitable or unsuitable based on the particular requirements for the particular application.

Figure 5:
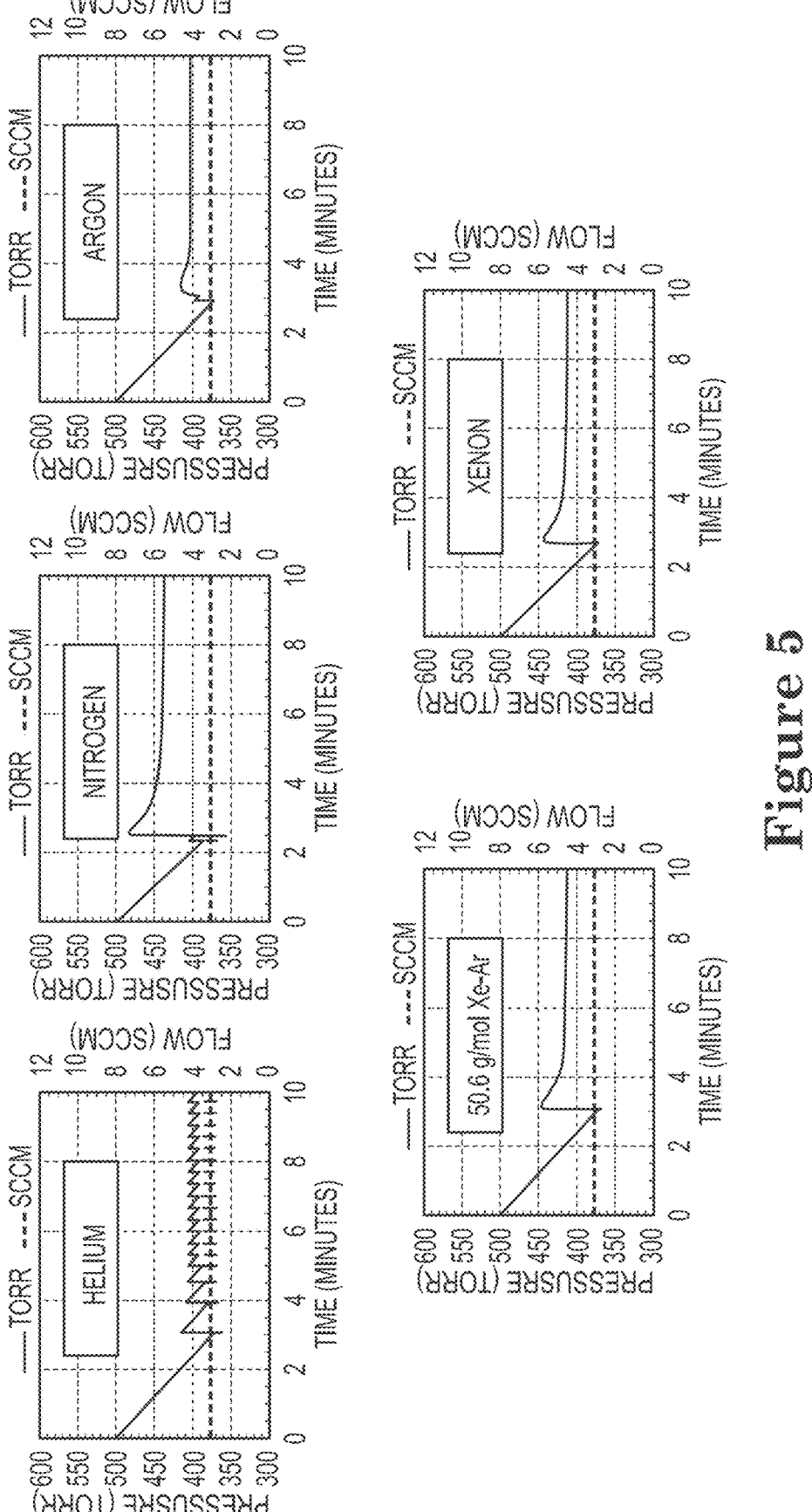
FIG. 5 shows a series of test results when using the same regulator assembly with different test fluids.

FIG. 5 shows a series of test results when using the same regulator assembly with different test fluids. In the trials from which the results shown in FIG. 5 were obtained, the same regulator assembly having the same outlet pressure from the first regulator was used for each of the trials, with only the supplied test fluid being changed. In the first trial shown in FIG. 5, helium was used as the test fluid. In the second trial, nitrogen was used as the test fluid. In the third trial, argon was used as the test fluid. In the fourth trial, an argon-xenon mixture was used as the test fluid. In the fifth trial, xenon was used as the test fluid. As can be seen in the respective results, test fluids having relatively higher molecular weights resulted in less spiking and oscillation compared to relatively lower molecular weight test fluids, even though the regulator assembly and the outlet pressure were the same across the trials. Accordingly, it is appreciated that the spiking and oscillation behavior observed in the flow varies with the molecular weight of the fluid being passed through the regulator assembly, with fluids having lighter molecular weights resulting in increased spiking and oscillation compared to fluids having heavier molecular weights. Accordingly, testing using a test fluid having a molecular weight representative of a selected fluid to be delivered through a regulator assembly can ensure a more accurate representation of the performance of a regulator assembly in use with a selected fluid. Also, the test fluid having a relatively lower molecular weight than the selected fluid can provide a safety margin to the testing, the test fluid being more susceptible to spiking and oscillation than will be experienced in use with the selected fluid.

Aspects:

It is understood that any of aspects 1-7 can be combined with any of aspects 8-15.

Aspect 1. A method of testing a regulator for a fluid supply package, comprising: introducing a test fluid into a plurality of separate test regulator assemblies, wherein:

the test fluid has a molecular weight that is between 80% and 110% of a molecular weight of a selected fluid to be supplied by the fluid supply package, and each of the plurality of test regulator assemblies includes a first regulator and a second regulator, the first regulator of each of the plurality of test regulator assemblies having a set outlet pressure;

observing a flow through the second regulators of each of the plurality of test regulator assemblies;

determining a number of spikes in the observed flow through the second regulators for each of the plurality of test regulator assemblies; and assembling a supply package regulator assembly for the fluid supply package, the supply package regulator assembly including the first regulator and the second regulator of one of the plurality of test regulator assemblies that exhibited fewer than two spikes in the observed flow.

Aspect 2. The method according to aspect 1, wherein the first spikes in the observed flow are spikes in the pressure of the observed flow.

Aspect 3. The method according to any of aspects 1-2, wherein the test fluid is a mixture of two or more fluids, and each of the two or more fluids are gases.

Aspect 4. The method according to any of aspects 1-3, wherein the molecular weight of the test fluid is between 85% and 95% of the molecular weight of the selected fluid.

Aspect 5. The method according to any of aspects 1-4, further comprising installing the supply package regulator assembly into the fluid supply package.

Aspect 6. The method according to any of aspects 1-5, wherein the selected fluid includes one or more of $CF_4$, CO, $BF_3$, $SiF_4$, $AsH_3$, $PH_3$, and $GeF_4$.

Aspect 7. The method according to aspect 6, wherein the selected fluid is a mixture further including $H_2$.

Aspect 8. A regulator assembly for a fluid supply container for a selected fluid, comprising:

a first regulator having an outlet pressure set to a predetermined set point; and a second regulator configured to receive fluid from the first regulator, wherein the predetermined set point is an outlet pressure that produces fewer than two spikes in a flow through the second regulator when the regulator assembly is operated with a test fluid, the test fluid having a molecular weight that is between 80% and 110% of a molecular weight of the selected fluid.

Aspect 9. The regulator assembly according to aspect 8, wherein the test fluid is a mixture of two or more fluids, and each of the two or more fluids are gases.

Aspect 10. The regulator assembly according to any of aspects 8-9, wherein the molecular weight of the test fluid is between 85% and 95% of the molecular weight of the selected fluid.

Aspect 11. The regulator assembly according to any of aspects 8-10 wherein the selected fluid includes one or more of $CF_4$, CO, $BF_3$, $SiF_4$, $AsH_3$, $PH_3$, and $GeF_4$.

Aspect 12. The regulator assembly according to aspect 11, wherein the selected fluid is a mixture further including $H_2$.

Aspect 13. A fluid supply container comprising the regulator assembly according to any of aspects 8-10, wherein the fluid supply container is configured to store the selected fluid.

Aspect 14. The fluid supply container according to aspect 13, wherein the selected fluid includes one or more of $CF_4$, CO, $BF_3$, $SiF_4$, $AsH_3$, $PH_3$, and $GeF_4$.

Aspect 15. The fluid supply container according to aspect 14, wherein the selected fluid is a mixture further including $H_2$.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

The invention claimed is:

1. A regulator assembly for a fluid supply container for a selected fluid, comprising:

a first regulator configured to receive the selected fluid and having an outlet pressure set to a predetermined set point; and a second regulator configured to receive the selected fluid from the first regulator at or near the outlet pressure of the first regulator and to further reduce the outlet pressure so as to supply the selected fluid to a tool;

wherein the predetermined set point of the outlet pressure of the first regulator is an outlet pressure that produces fewer than two spikes in a flow through the second regulator when the regulator assembly is operated with a test fluid, the test fluid having a molecular weight that is between 80% and 110% of a molecular weight of the selected fluid; and wherein the test fluid is not supplied to the tool.

2. The regulator assembly of claim 1, wherein the test fluid is a mixture of two or more fluids, and each of the two or more fluids are gases.

3. The regulator assembly of claim 1, wherein the molecular weight of the test fluid is between 85% and 95% of the molecular weight of the selected fluid.

4. The regulator assembly of claim 1, wherein the selected fluid includes one or more of $CF_4$, CO, $BF_3$, $SiF_4$, $AsH_3$, $PH_3$, and $GeF_4$.

5. The regulator assembly of claim 4, wherein the selected fluid is a mixture further including $H_2$.

6. A fluid supply container comprising the regulator assembly of claim 1, wherein the fluid supply container is configured to store the selected fluid.

7. The fluid supply container of claim 6, wherein the selected fluid includes one or more of $CF_4$, CO, $BF_3$, $SiF_4$, $AsH_3$, $PH_3$, and $GeF_4$.

8. The fluid supply container of claim 7, wherein the selected fluid is a mixture further including $H_2$.

9. A method of testing a regulator, comprising:

introducing a test fluid into a plurality of test regulator assemblies, wherein each of the plurality of test regulator assemblies includes a first regulator and a second regulator, and the test fluid has a molecular weight that is between 80% and 110% of a molecular weight of a selected fluid;

flowing the test fluid from the first regulator to the second regulator of each of the plurality of test regulator assemblies;

monitoring a flow of the test fluid through the second regulator of each of the plurality of test regulator assemblies;

determining a number of spikes in the monitored flow through the second regulator for each of the plurality of test regulator assemblies; and selecting a regulator assembly for a fluid supply package, the regulator assembly selected from one of the plurality of test regulator assemblies having a second regulator that exhibited fewer than two spikes in the monitored flow when the second regulator received the test fluid at or near the outlet pressure of a first regulator.

10. The method of claim 9, wherein the first spikes in the observed monitored flow are spikes in pressure of the observed monitored flow.

11. The method of claim 9, wherein the test fluid is a mixture of two or more fluids, and each of the two or more fluids are gases.

12. The method of claim 9, wherein the molecular weight of the test fluid is between 85% and 95% of the molecular weight of the selected fluid.

13. The method of claim 9, further comprising installing the supply package regulator assembly into the fluid supply package.

14. The method of claim 9, wherein the selected fluid includes one or more of $CF_4$, CO, $BF_3$, $SiF_4$, $AsH_3$, $PH_3$, and $GeF_4$.

15. The method of claim 14, wherein the selected fluid is a mixture further including $H_2$.

* * * * *